US008075386B1

(12) United States Patent
Leake

(10) Patent No.: US 8,075,386 B1
(45) Date of Patent: Dec. 13, 2011

(54) METHOD AND A SURFACE FOR PLAYING A WAGERING GAME OF CHANCE

(76) Inventor: Deborah L. Leake, Marshall, NC (US)

( * ) Notice: Subject to any disclaimer, the term of this patent is extended or adjusted under 35 U.S.C. 154(b) by 1192 days.

(21) Appl. No.: 10/750,434

(22) Filed: Dec. 30, 2003

Related U.S. Application Data

(60) Provisional application No. 60/437,675, filed on Jan. 2, 2003.

(51) Int. Cl.
*A63F 13/00* (2006.01)

(52) U.S. Cl. ........................................................ 463/18

(58) Field of Classification Search ......... 463/6, 16 -20, 463/27, 31, 37
See application file for complete search history.

(56) References Cited

U.S. PATENT DOCUMENTS

| | | | | |
|---|---|---|---|---|
| 5,169,154 | A * | 12/1992 | Borghi | 273/256 |
| 5,257,784 | A * | 11/1993 | Boylan et al. | 463/18 |
| 5,273,281 | A | 12/1993 | Lovell | 273/138 R |
| 5,651,735 | A * | 7/1997 | Baba | 463/18 |
| 5,813,911 | A * | 9/1998 | Margolin | 463/19 |
| 5,857,677 | A * | 1/1999 | Sum Chau | 273/292 |
| 5,909,875 | A * | 6/1999 | Weingardt | 273/269 |
| 5,935,001 | A * | 8/1999 | Baba | 463/18 |
| 6,165,069 | A * | 12/2000 | Sines et al. | 463/12 |
| 6,315,291 | B1 | 11/2001 | Moody | 273/139 |
| 6,336,860 | B1 * | 1/2002 | Webb | 463/22 |
| 6,368,213 | B1 | 4/2002 | McNabola | 463/18 |
| 2004/0204224 | A1 * | 10/2004 | Finnochio | 463/18 |

OTHER PUBLICATIONS

*Scarne's New Complete Guide to Gambling*, 1974 Edition, Simon & Schuster, Inc., New York, New York, pp. 490-499.

* cited by examiner

*Primary Examiner* — David L Lewis
*Assistant Examiner* — Eric M Thomas
(74) *Attorney, Agent, or Firm* — Renner, Kenner, Greive, Bobak, Taylor & Weber

(57) ABSTRACT

A method and a surface for playing a wagering game of chance against a house in which the player selects at least one indicia from each of two or more groups of a first indicia, and at least one indicia from a plurality of second indicia associated with each group. The player selects the indicia which he believes the house will randomly generate from the same groups and pluralities of indicia associated with each group, and places a wager with the house based upon the odds of that happening. The house then randomly generates indicia from the same groups and pluralities associated with each group, determines the number of matches and awards the player payouts based upon the number of matches.

4 Claims, 6 Drawing Sheets

METHOD AND A SURFACE FOR PLAYING A WAGERING GAME OF CHANCE

CROSS-REFERENCE TO RELATED APPLICATION

This application claims the benefit of U.S. Provisional Application No. 60/437,675 filed on Jan. 2, 2003.

TECHNICAL FIELD

This invention relates generally to a method and a surface for playing a wagering game of chance.

BACKGROUND ART

Conventional wagering games of chance in which a player selects indicia from pools or groups of indicia, and then the house randomly generates indicia from the same pools or groups, usually involve the selection of numbers or patterns of numbers. They include games such as keno and variations thereof.

The basic principles of keno are set out in *Scarne's New Complete Guide to Gambling,* 1974, pp. 490-499, Simon & Schuster, Inc., New York, N.Y. In keno, a player selects from one to fifteen numbers which he believes will be randomly generated by the house from a pool of one to eighty numbers. When the game is live, the player selects his numbers from a paper keno ticket, having a matrix of ten columns and eight rows of numbers consecutively presented, by marking the ticket with a crayon or other marker. The player then turns the paper keno ticket into the house, at the same time placing a wager. Next, the house proceeds to randomly select twenty numbers from the pool of one through eighty numbers. When the game is live, the house generally proceeds by manually selecting the balls from an air blower device that circulates the balls bearing the numbers 1 through 80, or by an electronic random number generator which displays them on a common board. The house then proceeds to determine the number of matches and to award the player an appropriate payout. The more numbers that match, the higher the payout.

Typically, live keno involves multiple players in any given game, and there may be no winners, or there may be multiple winners. Also typically, gaming establishments offering keno post payout charts showing the amount of money a player may win based upon the number of numbers selected by the player, the amount wagered by the player and the number of matches achieved by the player when twenty keno balls are drawn.

Unlike live keno, video or electronic keno involves a single player against a gaming machine. In this case, the player selects his numbers by touching numbers displayed on a screen using conventional touch screen technology. The player submits his wager by putting coins or tokens into the video machine, with the machine providing payout tables to assist the player in determining his desired wager. Random selection by the house is accomplished electronically, and is initiated by the player pushing a "start" button. Matches are also determined electronically, and payouts are made by accruing credits on the credit meter of the machine or dispensing coins or tokens into a payout tray.

Variations of live keno include the use of "way" tickets. Way tickets permit a player to select groups of selected numbers or "spots" to be played simultaneously on the same ticket for a given game of keno. Variations of electronic or video keno include "four card keno" in which the player is presented with four keno tickets each representing a separate game from he may select the same or different numbers, and may wager the same or different amounts per game. One group of twenty balls is drawn applicable to all four games and matches and payouts determined.

As has been recognized, conventional keno games, live and electronic or video, tend to be slow paced as they require little player participation, offer odds which are generally unfavorable to the player and consequently lack player appeal yielding lower revenues to the gaming facility. In attempt to overcome these deficiencies, Moody, U.S. Pat. No. 6,315,291, describes a variation of keno allowing the player to play different groups of numbers on the same keno ticket over the course of multiple draws. The player divides his ticket into sections, with different payouts being provided for having the various sections and the selected numbers over the course of multiple draws. Weingardt, U.S. Pat. No. 5,909,875, describes a variation of keno in which after the player has marked his keno ticket but prior to the start of the drawing of the balls, a electronic generator designates a predetermined number of balls within the pool of 1-80 balls to be "red," with the remainder designated as "white." This allows for additional payouts to the player depending upon whether the player has an all "red" keno winning combination or an all "white" winning combination or a "mixed color" winning combination. Lovell, U.S. Pat. No. 5,273,281 attempts to overcome the deficiencies of conventional keno by providing for sub-games which require a player to guess a set of numbers or the sequence of the guessed numbers in the series of randomly generated numbers. McNabola, U.S. Pat. No. 6,368,213, describes a variation of keno in which the player may designate subsets of the numbers selected. Margolin, U.S. Pat. No. 5,813,911 describes a variation of keno in which the player selects a pattern of squares on the playing board as opposed to numbers. A template is randomly generated in addition to numbers, with the player receiving additional payouts where the selected numbers fall within the randomly generated template.

None of these prior methods, including those intended to overcome the slow pace and generally unfavorable odds experienced by players, and lower yield of revenues to house, have considered dividing a first indicia on the a playing surface into a plurality of groups and associating each group with a plurality of second indicia allowing for additional selections, matches and payouts over the course of a single draw or round.

DISCLOSURE OF THE INVENTION

It is an object of this invention to provide a method and a surface for playing a wagering game of chance which allow for greater player participation and more favorable odds to the player, thereby increasing both the desirability of play and ultimately yielding more revenues to the house.

It is a further object of this invention to provide a method for a player to play a wagering game of chance involving multiple rounds in which the player selects one or more indicia from multiple pools of different indicia, while placing a wager based on the odds that the same indicia will be randomly generated from the same pools by the house over the course of a single round.

It is an additional object of the present invention to provide a method, as above, which takes into consideration multiple variables to calculate the odds of winning.

It is yet another object of this invention to provide a surface for a player to play a wagering game of chance having multiple rounds, the surface having pools of different indicia from which a player makes one or more selections, while placing a wager based on the odds that the same indicia will be randomly generated from the same pools by the house over the course of a single round.

These and other objects of the present invention, as well as the advantages thereof over existing prior art forms, which will become apparent from the description to follow, are accomplished by the improvements hereinafter described and claimed.

In general, this invention includes a method and a surface for playing a wagering game of chance against a house in which the player selects at least one indicia from each of two or more groups of a first indicia, and at least one indicia from a plurality of second indicia associated with each group. The player selects the indicia which he believes the house will randomly generate from the same groups and pluralities of indicia associated with each group, and places a wager with the house based upon the odds of that happening. The house then randomly generates indicia from the same groups and pluralities associated with each group, determines the number of matches and awards the player payouts based upon the number of matches.

This invention also includes a surface for playing a wagering game of chance having a plurality of groups of a first indicia, and a plurality of a second indicia associated with each group.

This invention includes a method for a player to play a wagering game of chance in which the player selects at least one indicia from each of a plurality of groups of the indicia. The player also selects at least one indicia from a plurality of different indicia associated with each of the groups. The player places a wager with the house based upon the odds of the house randomly generating the same indicia from the same groups and pluralities associated with each group. The house then randomly generates at least one indicia from each of the plurality of groups and one indicia from the plurality of indicia associated with each of the groups. The indicia selected by the player are compared with the indicia randomly generated by the house to determine if there are any matches, and the house awards the player payouts dependent on the matches.

This invention also includes a surface for a player to play a wagering game of chance having a plurality of groups of first indicia, and at least one plurality of second indicia associated with each of the groups of first indicia, the second indicia being different from the first indicia.

This invention further includes a method for a player to play a wagering game of chance in which the player selects at least one number from a first group of twenty numbers, one number from a second group of twenty numbers, one number from a third group of twenty numbers, and one number from a fourth group of twenty numbers, wherein the numbers of each of the groups are different from the numbers of the other groups. The player also selects at least one color from a plurality of four colors associated with each of the first, second, third and fourth groups of numbers, placing a wager based on the odds of the house randomly generating his selected numbers and colors. The house then randomly generates at least one number from the first, second, third and fourth groups, and one color from the plurality of colors associated with each of the first, second, third and fourth groups. The numbers and colors selected by the player are compared with the numbers and colors randomly generated by the house to determine if there are any matches, and the house awards the player payouts dependent on the matches.

Still further, this invention includes a method for a player to play a wagering game of chance in which the player selecting three numbers from a first group of forty numbers, and one number from a second group of forty numbers, wherein the numbers of the second group are different from the numbers of the first group. The player also selects at least one letter from a plurality of letters associated with the first group of numbers. The player also selects at least one color from a plurality of colors associated with the first group of numbers. The player also selects at least one number from the second group of numbers and at least one symbol from a plurality of symbols associated with the second group of numbers. The player places a wager with the house based upon the odds of the house randomly generating the same numbers from the same groups of numbers, and the same letters, colors and symbols associated with the different groups. The house then randomly generates at least three numbers from the first group and one number from the second group of numbers, one letter from the plurality of letters and one color from the plurality of colors associated with the first group of numbers, and one symbol from the plurality of symbols associated with the second group of numbers. The numbers, letters, colors and symbols selected by the player are compared with the numbers, letters, colors and symbols randomly generated by the house to determine if there are any matches, and the house awards the player dependent on the matches.

A preferred exemplary method and a surface for playing a wagering game of chance according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
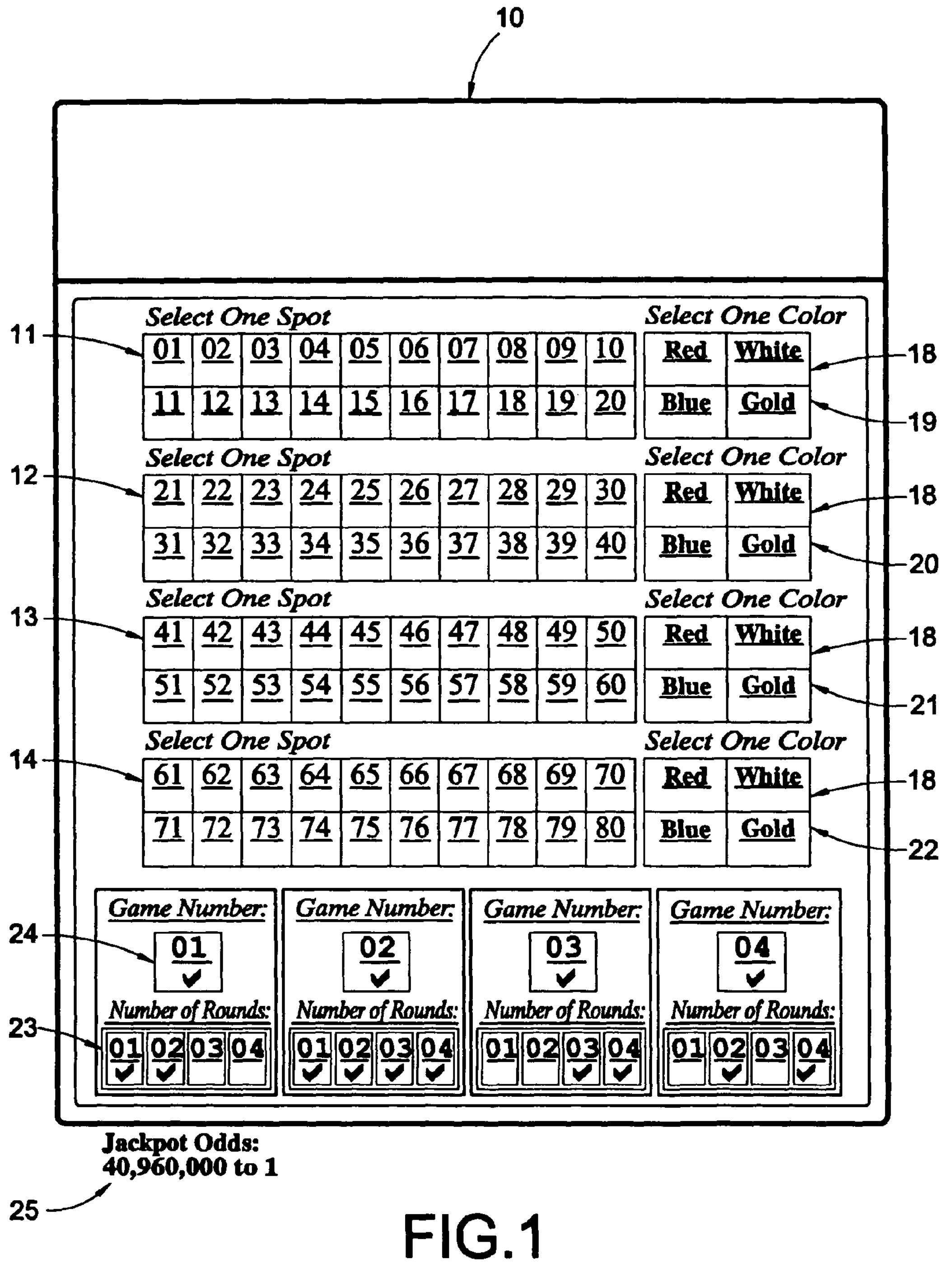
FIG. 1 illustrates a playing surface in accordance with one embodiment of the present invention.

FIG. 1 shows a playing surface generally indicated by the numeral 10, which may be used either as a paper ticket surface in the room or hall in which the method of the present invention is being used, or portrayed on a touch screen of an electronic devise on which the method of the present invention is used. The surface 10 of FIG. 1 is modeled after a conventional keno ticket to the extent that it has one through eighty consecutive numbers. The surface 10 departs from a conventional keno ticket, however, as the consecutive numbers are arranged in four groups 11, 12, 13 and 14, each having two rows and ten columns containing twenty numbers. Further, each of the four groups 11, 12, 13 and 14 is associated with a plurality of second indicia, generally indicated by the numeral 18.

In a preferred embodiment of the present invention as seen in FIG. 1, the second indicia 18 includes a plurality of four colors 19, 20, 21 and 22. The player begins by selecting one number or spot from the first group of twenty numbers 11.

The player also selects one color from the group of four colors 19. The player then selects one number from the second group of twenty numbers 12, and a color from the group of four colors associated with it 20. The player then proceeds to the third group of twenty numbers 13 and the group of four colors 21 associated with it and repeats the process. The player then proceeds to the fourth and final group of twenty numbers 14 and the group of four colors associated with it 22 and repeats the process. As illustrated in FIG. 1, the surface may also provide the player with the option of playing his selections in more than one round (draw) of any single game as indicated generally by numeral 23, and in more than one game as indicated generally by numeral 24. In this preferred embodiment 10, the player is provided with jackpot odds of 40,960,000 to 1, which odds may be given on the playing surface 10, here identified as numeral 25.

In the preferred embodiment of the method for which the surface 10 illustrated in FIG. 1 is employed, by way of example, the player may select the number "1" from the first group of numbers 11, and the color "red" from the associated group of three colors 19. The player may also select the number "30" from the second group of numbers 12 and the color "red" from the associated group of three colors 20, the number "50" from the third group of numbers 13 and the color "red" from the associated group of three colors 21 and the number "79" from the fourth group of numbers 14 and the color "blue" from the associated group of three colors 22. The player does so by marking his paper ticket with a crayon or other marker, and then submits his selections to the house along with a wager. The player's wager is based upon the player's belief that numbers and colors randomly generated by the house will match his selections in any given round. Additionally, the player may mark his paper ticket to indicate his desire to play his selections in more than one round of any given game 23, and in more than one game 24. The house will then proceed to randomly generate at least one number from each group 11, 12, 13, and 14, and one color from the group of three colors associated with each group of numbers 19, 20, 21 and 22, completing a round. For purposes of the method for which the surface 10 is used, four rounds constitutes one game 24. By way of this example, should the house generate the number "1" from the first group of numbers 11 and the color "red" from the associated group of colors 19 during a round designated by the player, the match will result in a payout by the house to the player.

Figure 2:
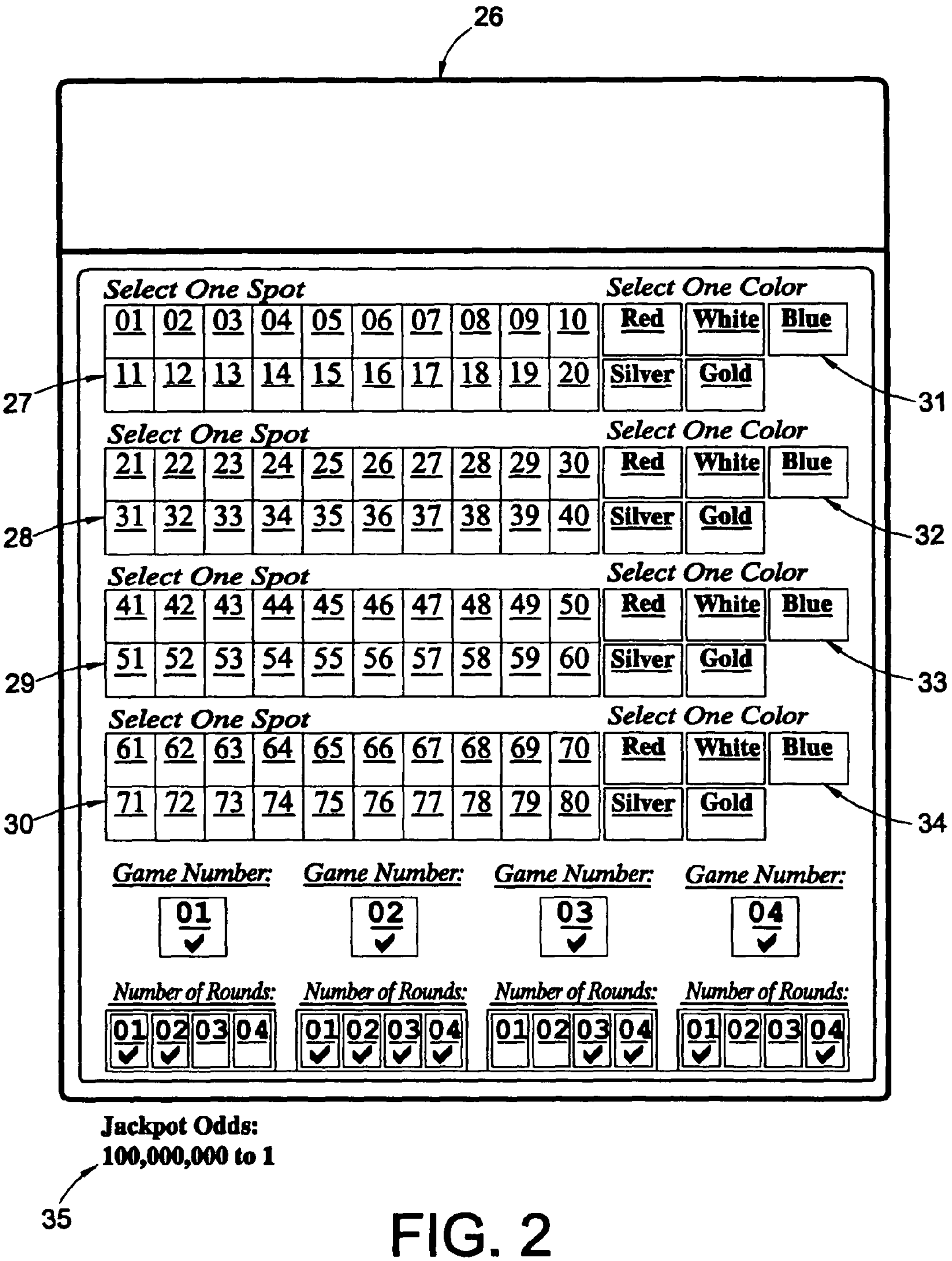
FIG. 2 illustrates an alternate embodiment of the playing surface of the present invention.

In another embodiment generally identified as numeral 26 in FIG. 2, each of four groups of twenty consecutive numbers 27, 28, 29 and 30 is associated with a group of five colors 31, 32, 33 and 34, whereby the player is provided with jackpot odds of 100,000,000 to 1, which odds may be shown on the playing surface 26, here identified by numeral 35.

Figure 3:
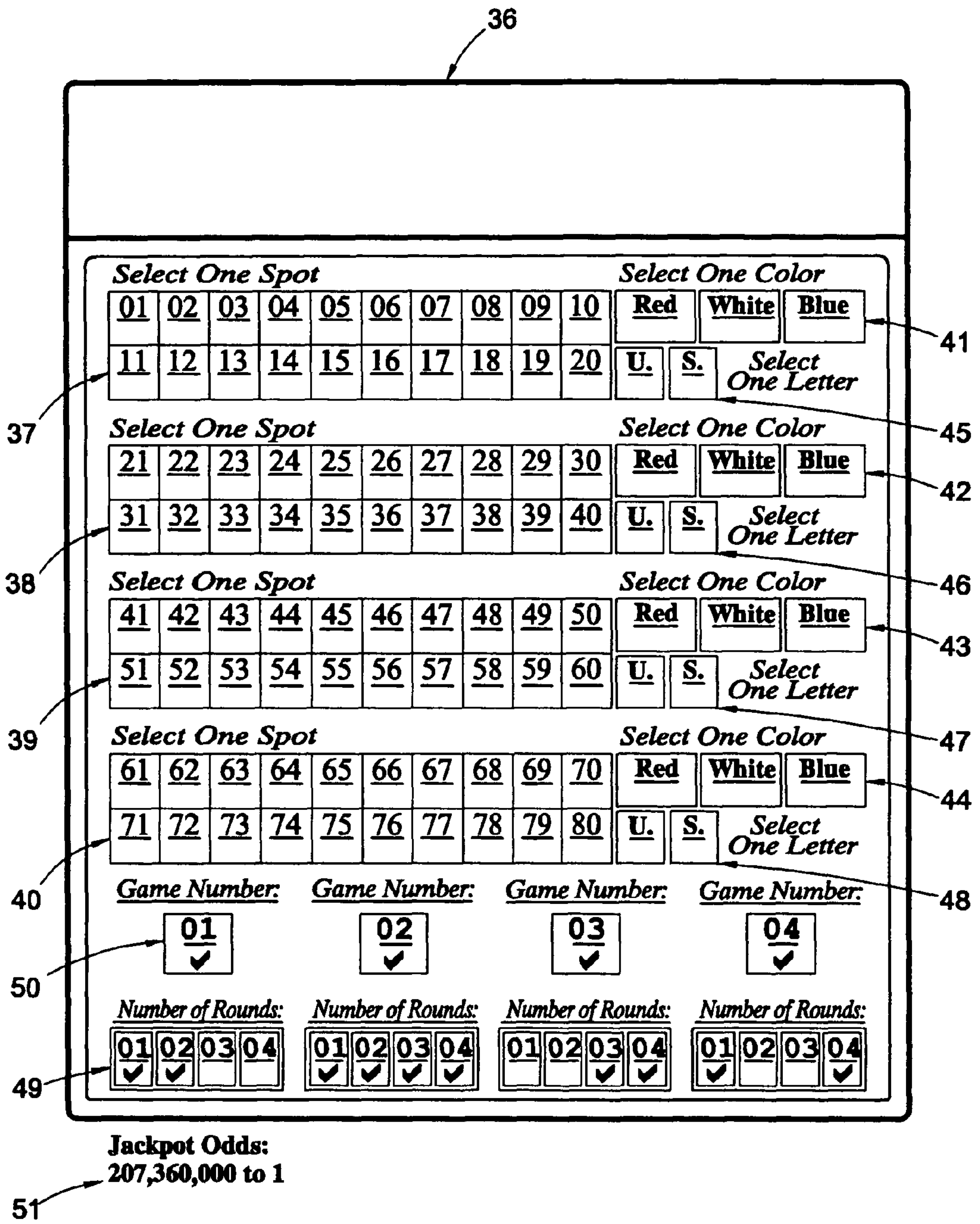
FIG. 3 illustrates another embodiment of the playing surface of the present invention.

In yet another embodiment of this invention also modeled after a conventional keno ticket 36 as illustrated in FIG. 3, the player selects one number from a first group of twenty consecutive numbers 37, one color from a group of three colors associated with the first group of numbers 41, and one letter from a group of two letters 45 also associated with the first group of numbers. The player then proceeds to repeat the process for each of three additional groups of numbers 38, 39 and 40 and associated groups of three colors 42, 43 and 44, and two letters 46, 47 and 48. As illustrated in FIG. 3, the playing surface 32 may again provide the player with the option of playing his selections in more than one round of any single game 49 and in more than one game 50. In this preferred embodiment, the player is provided with jackpot odds of 207,360,00 to 1, here identified by numeral 51.

Figure 4:
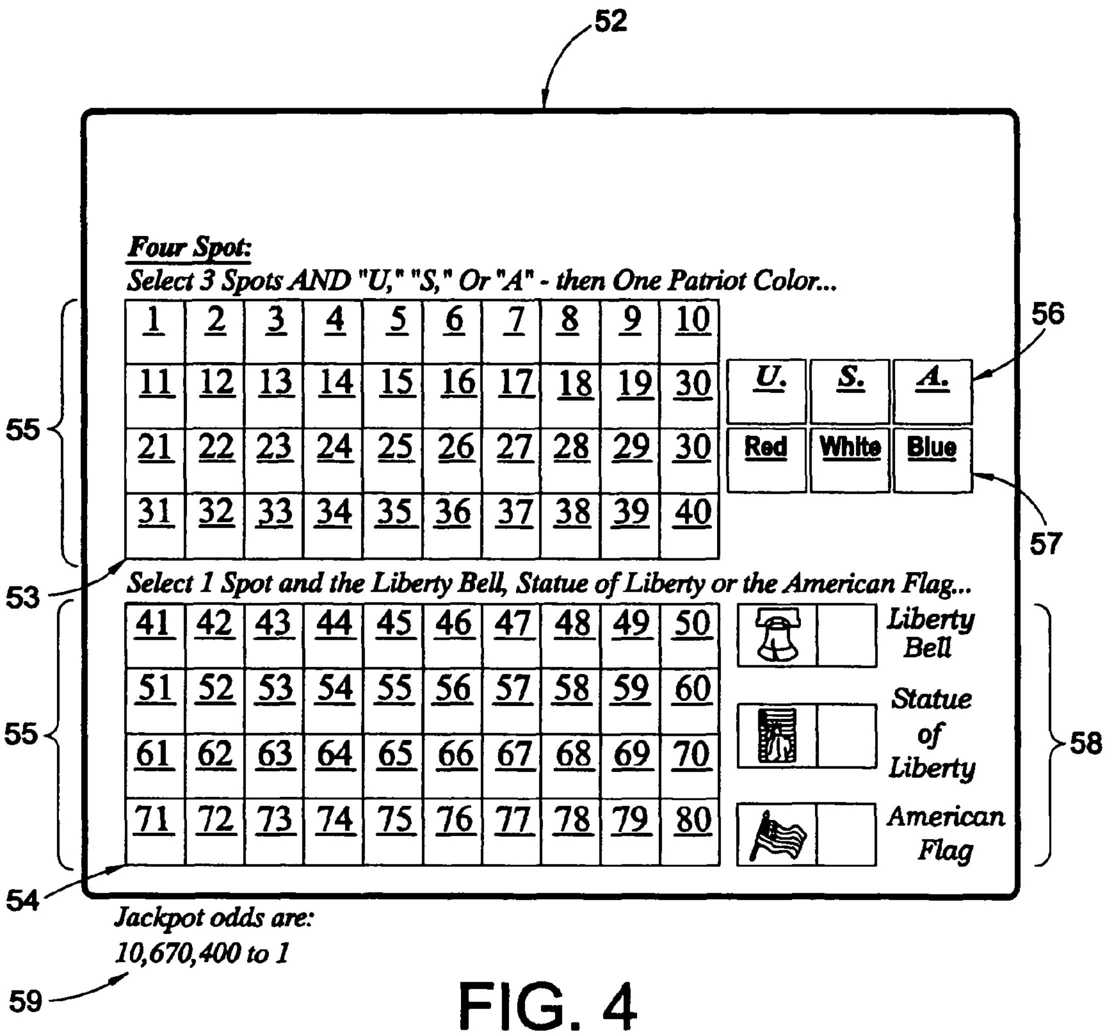
FIG. 4 illustrates another embodiment of the playing surface of the present invention.

In still another embodiment 52 as illustrated in FIG. 4, again although one through eighty consecutive numbers are used as in the conventional keno ticket, here the numbers are divided into two groups of numbers, one group 53 having numbers one through forty and a second group 54 having numbers forty-one through eighty arranged in four rows 55 of ten numbers each. Here the first group of numbers 53 is associated with a group of three letters 56 and three colors 57 as seen in FIG. 4. The second group of consecutive numbers 52, however, is associated with a group of three symbols 58. The player begins by selecting three numbers from the first group of consecutive numbers 53, one letter from the associated group of three letters 56, and one color from the associated group of three colors 57. The player next selects one number from the second group of consecutive numbers 54, and one symbol from the associated group of three symbols 58. Thus, in the preferred embodiment of FIG. 4, the player is provided jackpot odds of 10,670,400 to 1, identified by the numeral 59.

Figure 5:
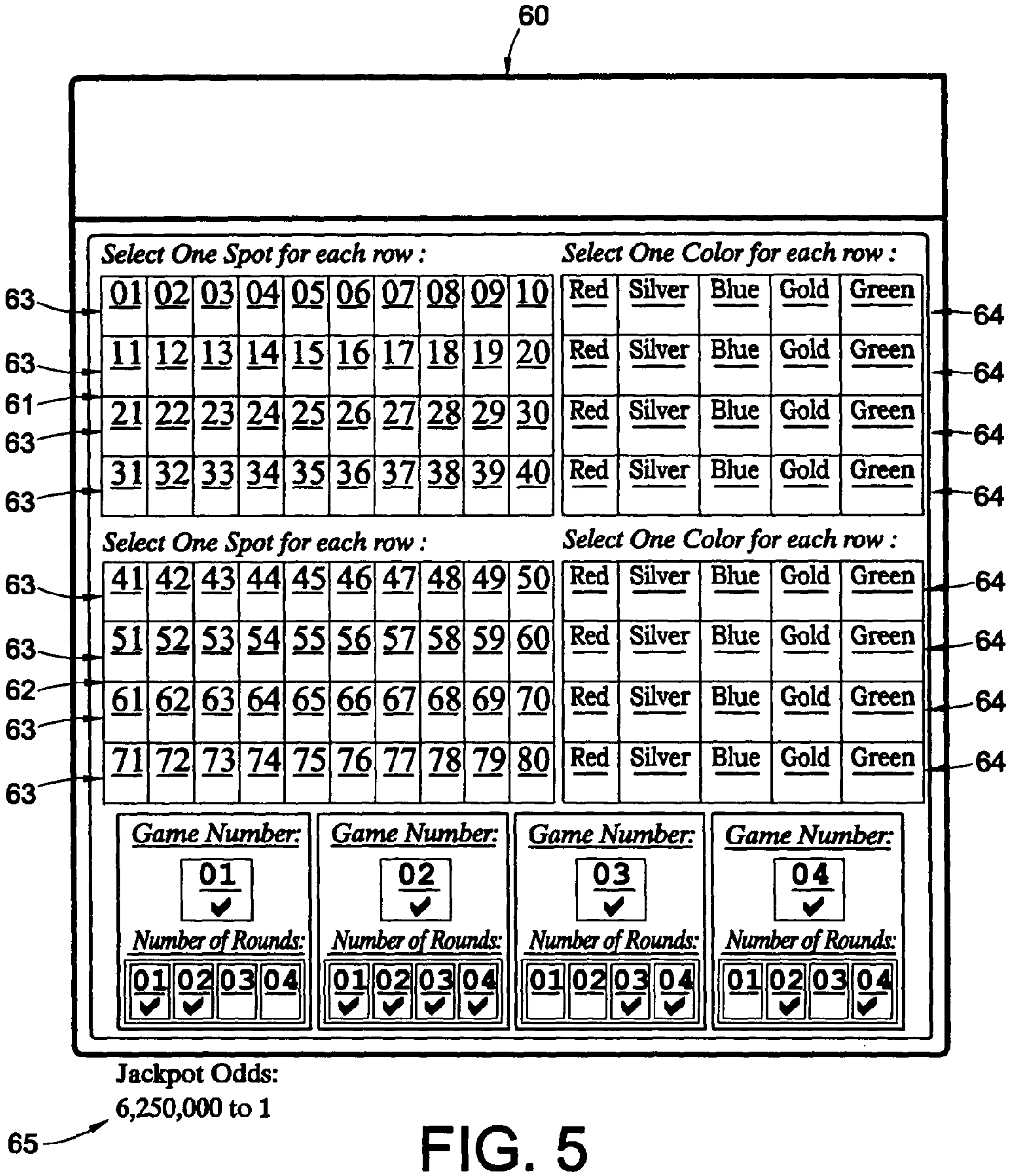
FIG. 5 illustrates another embodiment of the playing surface of the present invention.

In yet another embodiment 60 as illustrated in FIG. 5, wherein eighty consecutive numbers are similarly divided into two groups of one through forty numbers 61 and forty-one through eighty numbers 62, each row 63 is associated with a group of five colors 64, providing the player with jackpot odds of 6,250,000 to 1, identified by the numeral 65.

Figure 6:
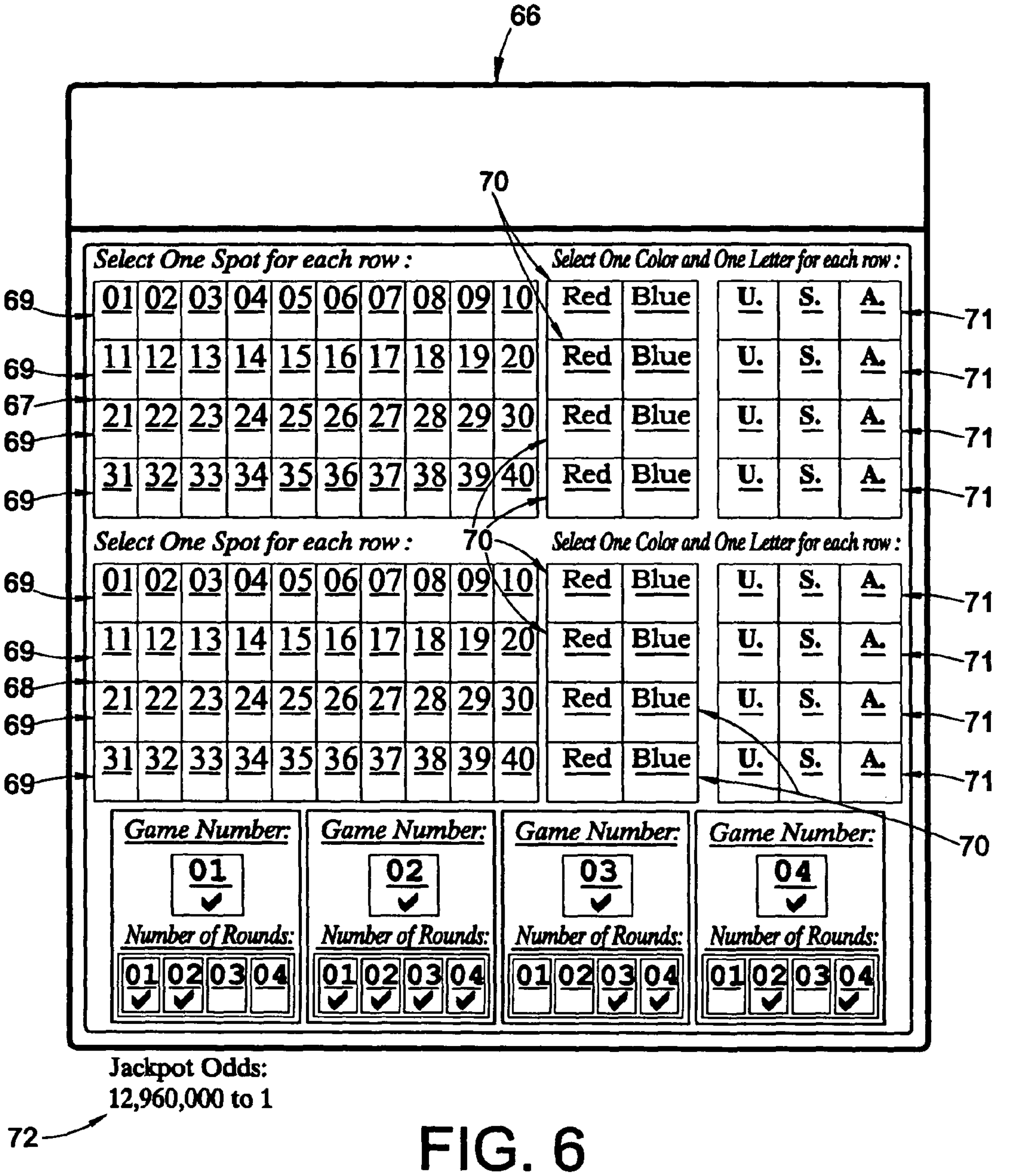
FIG. 6 illustrates another embodiment of the playing surface of the present invention.

In still another embodiment 66 as illustrated in FIG. 6, wherein eighty consecutive numbers are similarly divided into two groups of one through forty numbers 67 and forty-one through eighty numbers 68, each row 69 is associated with a group of two colors 70 and a group of three letters 71, providing the player with jackpot odds of 12,960,000 to 1, identified by the numeral 72.

In light of the foregoing, it should thus be evident that a method for playing a wagering game of chance and surface as described herein substantially improves the art and otherwise accomplishes the objects of the present invention.

What is claimed is:

1. A method for a player to play a wagering game of chance against a house comprising the steps of:

the house providing a plurality of groups of first indicia, and at least one separate plurality of different indicia for each group of first indicia, but separate and apart therefrom, from which the player may make selections;

the player making a first selection of at least one indicia from the plurality of groups of first indicia;

the player making a second selection of at least one indicia from the separate plurality of different indicia for each group of first indicia from which the player made a first selection;

the player then placing a single wager with the house with respect to the first and second selections of indicia made by the player;

after the single wager is placed by the player, the house randomly generating at least one indicia from each of the groups of first indicia, and at least one indicia from the plurality of different indicia associated with each of the groups of first indicia;

comparing the indicia selected by the player with the indicia randomly generated by the house to determine if there are any matches;

and the house awarding the player dependent on the type and number of said matches.

2. A method for a player to play a wagering game of chance against a house comprising the steps of:

the house providing four groups of twenty numbers, wherein the numbers of the four groups are different;

the house providing at least one separate group of plurality of indicia for each one of the four groups of twenty numbers but separate and apart therefrom, from which the player may make selections;

the player making a first selection of one number from each of the four groups of twenty numbers;

the player making a second selection of one indicia from each of the pluralities of indicia;

the player placing a single wager with the house with respect to the first and second numbers and selections of indicia made by the player;

after the single wager is placed by the player, the house randomly generating at least one number from each of the four groups of twenty numbers, and one indicia from each of the pluralities of indicia associated with each of the four groups of twenty numbers;

comparing the selections of numbers and the indicia selected by the player with the numbers and indicia randomly generated by the house to determine if there are any matches;

and the house awarding the player dependent on the type and number of said matches.

3. A method for a player to play a wagering game of chance against a house comprising the steps of:

the house providing a first group of forty numbers and a second group of forty numbers, wherein the numbers of the first group are different from the numbers of the second group, from which the player may make selections;

the house providing at least two pluralities of indicia for only the first group of forty numbers, and at least one plurality of indicia for only the second group of forty numbers, wherein the indicia of the pluralities are different and the pluralities are separate and apart from each other and from the groups of forty numbers, from which the player may make selections;

the player making a first selection of three numbers from the first group of forty numbers;

the player making a second selection of one indicia from each of the pluralities of indicia associated with the first group of forty numbers;

the player making a third selection of one number from the second group of forty numbers;

the player making a fourth selection of one indicia from the plurality of indicia associated with the second group of forty numbers;

the player placing a single wager with the house with respect to said selections of numbers and indicia made by the player;

after the single wager is placed by the player, the house randomly generating at least one number from the first group of forty numbers and at least one number from the second group of forty numbers, and one indicia from each of the pluralities of indicia associated with the first group of forty numbers and the second group of forty numbers;

comparing the selections of numbers and the indicia selected by the player with the numbers and indicia randomly generated by the house to determine if there are any matches;

and the house awarding the player dependent on the type and number of said matches.

4. A method for a player to play a wagering game comprising the steps of:

the player selecting three numbers from a first group of forty numbers;

the player selecting one number from a second group of forty numbers, wherein the numbers of said second group are different from the numbers of said first group;

the player selecting at least one letter from a plurality of letters associated with only said first group;

the player selecting at least one color from a plurality of colors associated with only said first group;

the player selecting at least one symbol from a plurality of symbols associated with only said second group;

the player placing a single wager with the house with respect to all selections of numbers, letters, colors and symbols made by the player;

after the single wager is placed by the player, the house randomly generating at least three numbers from said first group and one number from said second group, one letter from said plurality of letters associated with each of said first group and one color from said plurality of colors associated with each of said first group and one symbol from said plurality of symbols associated with said second group;

comparing the numbers, letters, colors and symbols selected by the player with the numbers, letters, colors and symbols randomly generated by the house to determine if there are any matches; and the house awarding the player dependent on the type and number of said matches.

* * * * *